H. HIGGIN.
TOP PROP NUT.
APPLICATION FILED APR. 17, 1905.
949,897. Patented Feb. 22, 1910.
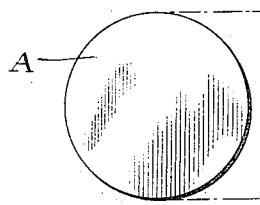
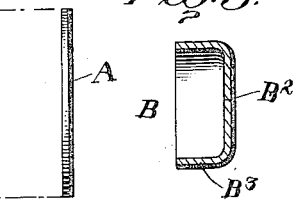
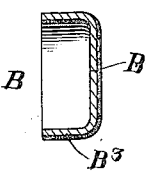
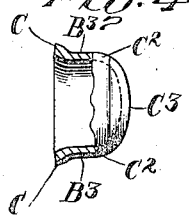
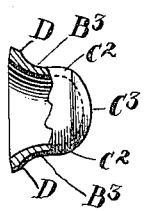
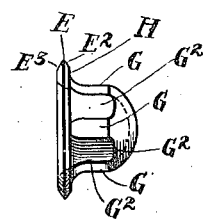
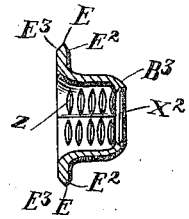
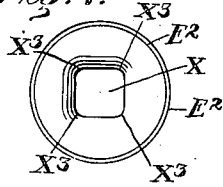
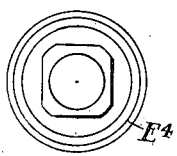
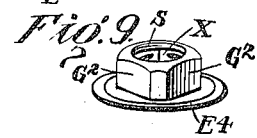
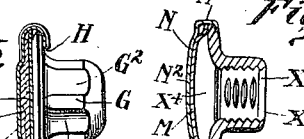
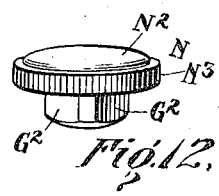
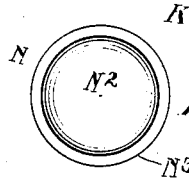
Witnesses
Samuel A. West.
N. Smith
Inventor
Henry Higgin,
per Wm. Hubbell Fisher
Attorney

UNITED STATES PATENT OFFICE.

HENRY HIGGIN, OF NEWPORT, KENTUCKY, ASSIGNOR TO THE HIGGIN MANUFACTURING COMPANY, OF NEWPORT, KENTUCKY, A CORPORATION OF WEST VIRGINIA.

TOP-PROP NUT.

949,897. Specification of Letters Patent. Patented Feb. 22, 1910.

Application filed April 17, 1905. Serial No. 256,140.

*To all whom it may concern:*

Be it known that I, HENRY HIGGIN, a citizen of the United States, and a resident of the city of Newport, in the county of Campbell and State of Kentucky, have invented certain new and useful Improvements in Top-Prop Nuts, of which the following is a specification.

Among the principal objects of my invention may be mentioned the following:—First:—Accuracy and perfect uniformity in the product of a nut of a given pattern. Secondly:—A nut which may be very cheaply produced. Thirdly:—A nut of a novel and useful conformation. Fourthly:—A nut, whereof one or more parts of the complementary covering that may be combined with it are new and contribute to its simplicity of construction and to the economy of its manufacture, and afford other advantages hereinafter specified. Fifthly:—A nut of a novel conformation, and combined with one or more parts for covering its end, this novel shape contributing to the better attachment of these parts. Sixthly:—A nut of a novel conformation, and provided with a complementary covering, one or more parts of which are new, and contribute to its simplicity of construction, and give the advantages hereinafter fully apparent.

The various advantages of my invention including not only those already briefly touched upon, but others, will be fully apparent from the following description and claims.

In the accompanying drawings, making a part of this specification, and in which similar letters of reference indicate corresponding parts,—Figure 1 is an elevation of the front or rear face of a blank from which the nut is constructed. Fig. 2 is an elevation of the edge of this blank. Fig. 3 represents a vertical central section of the article into which the said blank is first formed, and illustrating this step in the process of making this nut. Fig. 4 is a view partly in elevation and partly in section, representing the shape produced after the next step in the process. Fig. 5 represents, partly in elevation and partly in section, the same piece of metal, after being subjected to the next step. Fig. 6 shows in elevation the nut shaped exteriorly, as the result of a succeeding step. Fig. 7 is a bottom view of the partially completed article shown in Fig. 6. Fig. 8 is a top view of this article after being subjected to the next step. Fig. 9 is a view in perspective of a completed nut. Fig. 10 is a central vertical section of the nut shown in Fig. 9. Fig. 11 represents a vertical central section of this nut combined with end cap-pieces, the latter being new in such a combination and the nut being intentionally adapted by construction to accomplish this combination in a very efficient manner. The foregoing combination forms a valuable carriage nut. Fig. 12 is a view in perspective of the nut which is the subject of Fig. 11. Fig. 13 is a top view of the cap-piece adapted to be fitted upon the end of the nut of Fig. 9. Fig. 14 is a view in perspective of the cap shown in Fig. 13. Fig. 15 is a view partly in section and partly in elevation of the nut and an assemblage of cap-pieces, with which the nut is combined.

I will now proceed to describe my invention in detail.

Referring to the manner in which the nut is made in order that the completed article may be more fully understood I take a piece of sheet metal, preferably sheet steel. Out of this I punch a circular blank A, see Figs. 1 and 2. This blank I then submit to a die which forms or draws the blank into the shape of a cup B, having a top $B^2$ and wall or sides $B^3$, in the usual well known manner. The next step includes two sub-steps which could be formed in succession, but are preferably made simultaneously. One of these steps consists of bending out the lower edge of the wall $B^3$ so as to form the inclined annular edge of C. The other of these steps is the forming of the corner between the wall $B^3$ and the top $B^2$ into an arched top $C^2$. The central portion $C^3$ of the top $B^2$ is at the same time bent into an arched shape, see Fig. 4, for important reasons hereinafter mentioned. The next step causes the edge C of this partially formed nut to be bent outward still more and assume the shape D, illustrated in Fig. 5. After this operation, this partially formed nut is subjected to the action of a die, which forms the inclined edge D into an annular edge or flange E, whose base extends substantially at right angles to the axis of the nut. In this same operation, the outer edge of the rim is preferably left with a bevel $E^2$ on the upper side and with a bevel E³ on the under side. The object of this bevel E³ on the under side is to avoid the necessity of trimming the edge of the nut. The upper bevel E² is especially advantageous in certain cases where this nut is combined with an end piece or cover or cap. At the same time, the metal or circular wall B³ of the nut is formed into faces G², leaving a space G of the wall B³, between adjacent faces G². The preferred number of these faces is four. The die that forms them is one that is entirely exterior to the wall B³. There is no inner die present within this partially formed nut. This outer die is simply one that comes down upon the top of the nut from above and crowds the metal of the wall at the places G² back into the interior spaces X of the nut. The punch crowds the arch toward the center and the metal being stiff enough to resist going downward, is forced into the punch and centrally into the space X aforementioned. By this operation, I am enabled to dispense with dies advancing in the same plane against the side simultaneously and the expense attendant upon such dies and their use. It is to be noted that the flattened corner faces G are much thicker than other portions of the wall B³ and contribute to the general strength of the structure, being integral with the remainder of the wall B³ and with the flange H. The next step consists in flattening down the top G², thereby causing the top of the nut to appear as in Fig. 8. At the same time, the edge of the flange of the nut is depressed at E⁴, substantially as shown in Figs. 8 and 9. As a next step, the hole X² is cut in the top of the nut, and lastly the screw thread Z is formed by a tap within the nut. In cutting the hole through the top of the nut, in order to carry as much metal as possible down into the body of the nut and to thicken up the walls thereof, the hole is punched from the outside, and without providing any inside support. Inasmuch as the general conformation of the space X within the nut is, when viewed from the bottom, substantially rectangular, the threads of the screw Z will not be absolutely continuous everywhere, but be intermitted at the corners X³ of the space X. But the thread is usually continuous at and in the upper edge S.

The nut is now complete. To this nut may be applied a suitable cap or cover, formed of one or more parts. Thus in Fig. 15, I have shown one kind of cap united to a nut where the edges of the flange H of the nut are as shown in Fig. 6. In this cap shown in Fig. 15, there is a flat metal disk K, lying against the bottom of the nut. Next to this and outside of it is a piece of pasteboard or the like, the middle portion of which is preferably enlarged substantially as shown. Outside of this there is a disk K³ of metal, or other suitable material, whose central portion is convex so as to fit over and receive the enlarged portion of the part K². All these disks K, K², K³ are held in place by an annular disk K⁴, whose edge is bent up over and upon the flange H of the nut.

The preferred description of cap, and which is of my invention, I will now describe. There is a disk M, convexly arched as shown, and provided at its outer edge portion with an annular flange which, relatively to the center of the arch of this disk M, is much depressed. This annular portion M² rests against the bottom or under side of the flange H of the nut. Outside of this I locate a second cap N having its bottom or discal portion N² arched away similarly to that of the disk M. This cap has a deep edge extending at an angle, preferably a right one, to the general plane of the disk. When this cap N is placed in position upon the discal cap M, the edge N³ of this cap extends up and beyond the outer edge of the flange H. At the free edge of this side, the edge N³ is then bent down and over flange H and into the recess E⁴ previously formed upon the nut for its reception. The edge N³ is preferably corrugated, thus adding to the stiffness of the cap. The arch in the parts M and N is very advantageous, first, because the cap has increased strength to resist pressure brought laterally against it, and also because there is added space X⁴ into which the end of the bolt upon which this nut is screwed may project without injuring the cap or forcing it up from the nut. This capped nut produces a very valuable, useful and advantageous carriage nut. In certain lines of manufacture, one of these caps M or N, especially cap N, may be omitted, the other cap being retained. In case the cap M is retained, it may be held to place by an annular piece such as K⁴, or by any other suitable means.

What I claim as new, and of my invention and desire to secure by Letters Patent, is:—

1. As a new article of manufacture, a top prop nut having a continuous bottom flange substantially circular and beveled above and below to a thin peripheral edge, for the reception of an ornamental cap, the nut having an arched top portion, provided with a central circular aperture, whose wall is provided interiorly with a continuous screw thread, the body of the nut between the arched top and the broad outwardly extending flange at the bottom being formed in faces exteriorly flat for the application of a wrench, substantially as and for the purposes specified.

2. As a new article of manufacture, a top prop nut having a continuous bottom flange substantially circular and beveled above and below to a thin peripheral edge, for the reception of an ornamental cap, the nut having an arched top portion provided with a central circular aperture whose wall is provided interiorly with a continuous screw thread, the body of the nut between the arched top and the broad outwardly extending flange at the bottom being formed in faces exteriorly flat for the application of a wrench, and the inner wall of the nut being likewise formed in faces corresponding to the exterior faces of the nut, these inner faces being each provided with a portion of a screw thread constituting a continuation of the continuous thread of the arched portion, substantially as and for the purposes specified.

3. As a new article of manufacture, a top prop nut having an arched top provided with a central aperture having a continuous screw thread, the body of the nut below the arched top being formed exteriorly and interiorly with flat faces, these interior faces being provided with screw threads constituting a supplement of the screw thread of the arched top, and below the body the flange extending out therefrom, the wall of the nut tapering and increasing in size from the arched top to and into the bottom flange, the arched top, the nut body and the bottom flange being seamless and integral, substantially as and for the purposes specified.

4. As a new article of manufacture, a seamless top prop nut having an arched top provided with a central aperture having a continuous screw thread, the body of the nut below the arched top being formed exteriorly and interiorly with flat faces, the interior faces being provided with screw threads for extending the screw portion of the nut for engaging the bolt, and the flange at the lower end of the body extending out therefrom, and the cap on the under side of this flange and having its edges bent over and upon the edge portion of this flange, substantially as and for the purposes specified.

5. As a new article of manufacture, a top prop nut having an arched top provided with a central aperture having a continuous screw thread, the body of the nut being formed exteriorly and interiorly with flat faces, the interior faces being provided with screw threads interrupted at the corners of the interior face of the nut, a flange below the body and extending out from the body, the wall of the nut tapering and increasing in size from the arched top to the bottom flange, which latter increases in size from its junction with the body, the entire nut being seamless and all of its parts integral the one with another and a cap spread over the bottom of this flanged nut and grasping the edge portion of the flange, substantially as and for the purposes specified.

6. As a new article of manufacture, a top prop nut having an arched top provided with a central aperture having a continuous screw thread, the body of the nut below the arched top being formed exteriorly and interiorly with flat faces, the interior flat faces provided with screw threads constituting a supplement of the screw thread of the arched top, and below the body the flange extending out therefrom, the wall of the nut tapering and increasing in size from the arched top to and into the bottom flange, the arched top, the nut body and the bottom flange being seamless and integral and the cap seamless and integral and covering the bottom flange and the adjacent end of the aperture of the nut with an impervious cover, the cap being united to the flange by the outer edge portion of the clamp crimped over the outer end, substantially as and for the purposes set forth.

HENRY HIGGIN.

Attest:
JOHN E. FITZPATRICK,
K. SMITH.